(12) United States Patent
Yim et al.

(10) Patent No.: US 8,171,239 B2
(45) Date of Patent: May 1, 2012

(54) STORAGE MANAGEMENT METHOD AND SYSTEM USING THE SAME

(75) Inventors: Keun Soo Yim, Yongin-si (KR); Gyu Sang Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 584 days.

(21) Appl. No.: 12/052,233

(22) Filed: Mar. 20, 2008

(65) Prior Publication Data

US 2009/0132761 A1    May 21, 2009

(30) Foreign Application Priority Data

Nov. 15, 2007 (KR) .................. 10-2007-0116780

(51) Int. Cl.
*G06F 12/00* (2006.01)
(52) U.S. Cl. ............... 711/154; 711/157; 711/E12.009; 711/165; 711/E12.079; 711/E12.082; 710/52; 710/53
(58) Field of Classification Search .................. None
See application file for complete search history.

(56) References Cited

U.S. PATENT DOCUMENTS

| | | | |
|---|---|---|---|
| 6,286,016 B1 | 9/2001 | Heller et al. | |
| 6,430,580 B1 | 8/2002 | Azagury et al. | |
| 6,604,168 B2 * | 8/2003 | Ogawa | 711/103 |
| 6,826,583 B1 | 11/2004 | Flood et al. | |
| 2003/0061447 A1 * | 3/2003 | Perego et al. | 711/131 |
| 2006/0245226 A1 * | 11/2006 | Stewart | 365/22 |
| 2009/0044078 A1 * | 2/2009 | Vogan et al. | 714/773 |

FOREIGN PATENT DOCUMENTS

| | | |
|---|---|---|
| JP | 8-314775 | 11/1996 |
| JP | 2001-331367 | 11/2001 |
| KR | 10-1999-027155 | 4/1999 |
| KR | 10-2004-0005275 | 1/2004 |
| KR | 10-2004-0100262 | 12/2004 |
| KR | 10-2005-0043291 | 5/2005 |
| KR | 10-2005-0077602 | 8/2005 |
| KR | 10-2006-0080972 | 7/2006 |
| KR | 10-2006-0134011 | 12/2006 |
| KR | 10-2007-0093447 | 9/2007 |

* cited by examiner

*Primary Examiner* — Reginald Bragdon
*Assistant Examiner* — Baboucarr Faal
(74) *Attorney, Agent, or Firm* — NSIP Law

(57) ABSTRACT

A storage management system and a storage management method are provided. The storage management system includes a host, a memory buffer, a plurality of storage blocks, and an input/output bus to perform an interface function among the host, the memory buffer, and the plurality of storage blocks, wherein each of the plurality of storage blocks is connected with the input/output bus via a corresponding channel, and the plurality of storage blocks is managed for each channel group generated by grouping at least one channel.

17 Claims, 9 Drawing Sheets

STORAGE MANAGEMENT METHOD AND SYSTEM USING THE SAME

CROSS-REFERENCE TO RELATED APPLICATION

This application claims the benefit under 35 U.S.C. §119 (a) of a Korean Patent Application No. 10-2007-0116780, filed on Nov. 15, 2007, in the Korean Intellectual Property Office, the entire disclosure of which is incorporated herein by reference.

TECHNICAL FIELD

The following description relates to a storage device, and more particularly, to a system and method for managing a data storage process of a storage device.

BACKGROUND

Types of data storage include a magnetic disk, a semiconductor memory, and the like. Since each type of the data storage may have different physical characteristics, a management system corresponding to the different physical characteristics may be necessary.

A magnetic disk is widely used as a conventional data storage device. For example, a magnetic disk has an average read/write time in milliseconds per kilobyte. As another characteristic, a read/write time may vary depending on the location of data due to a time required for an arm to reach the physical location of the data.

Compared to a magnetic disk, a non-volatile memory device typically has a shorter read/write time, consumes less power, and occupies a smaller area. It is rapidly substituting a magnetic disk as mass storage.

A non-volatile memory device may be a semiconductor memory device which may electrically perform a read, write, and erase function, and may maintain programmed data even where a supply power does not exist. A data storage process of a non-volatile memory device is referred to as either a write or a programming.

A non-volatile memory device is widely used in digital cameras, cellular phones, Personal Data Assistants (PDAs), laptop computers, and the like, and may store a large amount of data in a small area on a semiconductor chip.

A NAND flash memory may be referred to as a form of non-volatile memory device and is widely used as a mass storage. A NAND flash memory may be characterized in that it has a read time of tens of microseconds per kilobyte, and a write time of hundreds of microseconds per kilobyte. Generally, a NAND flash memory has an erase time that is different from a write time. Since the erase time may correspond to several milliseconds, a method of simultaneously erasing a plurality of memory cells is widely used for reducing the erase time for entire data. A unit of the plurality of memory cells simultaneously erased may be referred to as an erase unit.

As described above, since a non-volatile memory, such as a NAND flash memory, has an asymmetric read/write/erase characteristic in that a time required for a read, a time required for a write, and a time required for an erase are different from each other, it is very different from a conventional magnetic disk. Also, since the non-volatile memory electrically accesses data, a location storing the data scarcely affects the read/write/erase characteristic.

In a conventional magnetic disk, a process of erasing data is included in a data write process. Accordingly, a separate time is unnecessary. To update data, a location where previous data is stored is overwritten with the updated data.

In a non-volatile memory, a process of erasing data is separate from a write process. And because a relatively long separate time is typically needed for the process of erasing the data, a relatively long time may be required to update data where an update method applied for a conventional magnetic disk is applied to a non-volatile memory. In particular, where the data is randomly accessed and updated, it is well-known that an update time particularly increases.

A controller and/or system accessing a non-volatile memory may set a logic memory address to be different from a physical memory address of the non-volatile memory, and an interface may map the logic memory address and the physical memory address.

An interface applied to a flash memory may be referred to as a Flash Translation Layer (FTL).

SUMMARY

In one general aspect, there is provided a storage management method and system using the same which increases a parallelism when accessing data with respect to a storage device.

In another general aspect, there is provided a storage management method and system using the same which reduces the occurrence of garbage collection due to a locality of accessed data.

In still another general aspect, there is provided a storage management method and system using the same which provides an operation priority of a channel for accessing a storage device.

In a further general aspect, a storage management system includes a host, a memory buffer, a plurality of storage blocks, and an input/output bus to perform an interface function among the host, the memory buffer, and the plurality of storage blocks, wherein each of the plurality of storage blocks is connected with the input/output bus via a corresponding channel, the plurality of storage blocks inputs/outputs data into/from the input/output bus in parallel, and the plurality of storage blocks is managed for each channel group generated by grouping at least one channel.

In still another general aspect, a storage management system includes a host, a memory buffer, a plurality of channel connected to at least one storage block, wherein the storage blocks are managed for each channel group generated by grouping at least one channel.

In yet another general aspect, a storage management method of a storage management system which comprises a host, a memory buffer, and a plurality of storage blocks, and in which each of the plurality of storage blocks is connected with an input/output bus via a corresponding channel, includes generating a channel group by grouping at least one channel, managing each of the plurality of storage blocks for each channel group, and inputting/outputting data in parallel via the input/output bus with respect to the plurality of storage blocks.

Other features and aspects may be apparent to those skilled in the art from the following detailed description, the attached drawings, and the claims.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, description of well-known functions and constructions are omitted to increase clarity and conciseness.

Figure 1:
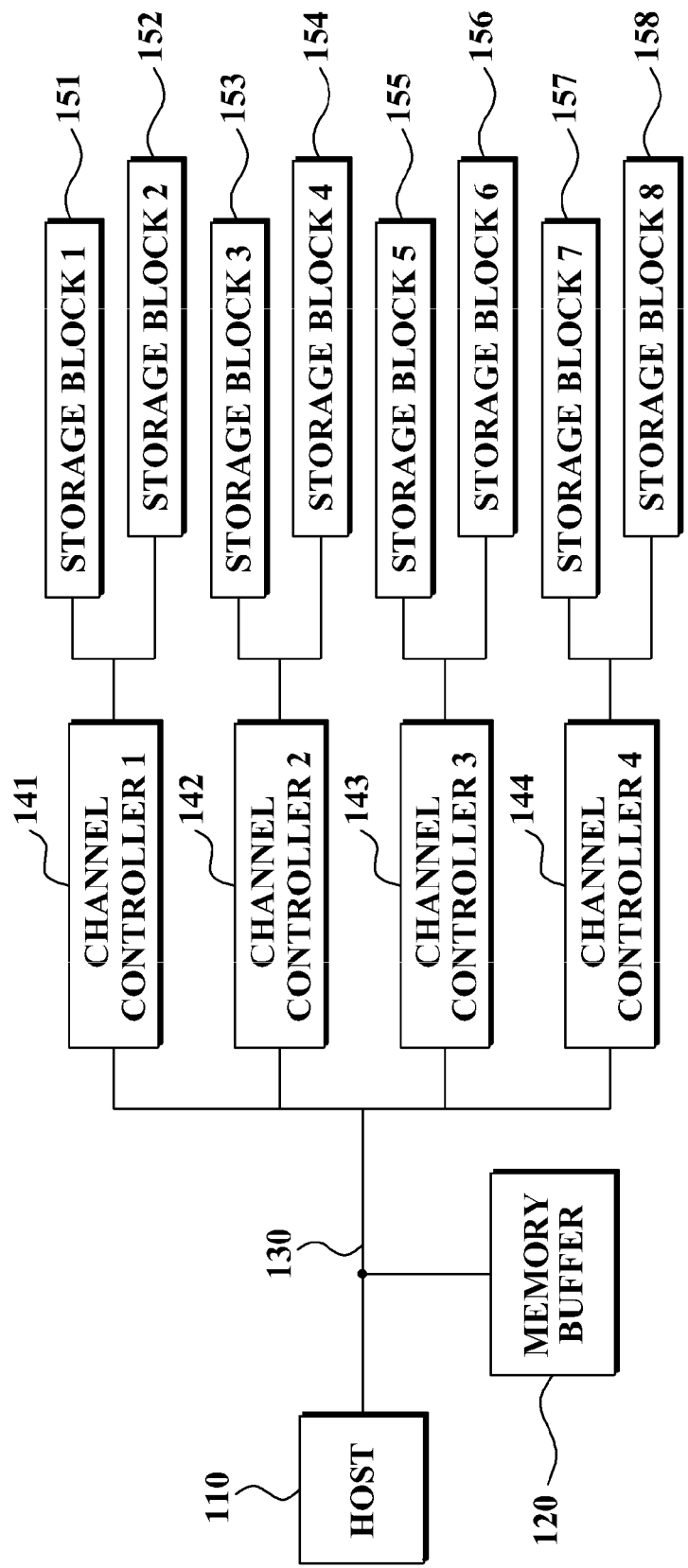
FIG. 1 is a configuration diagram illustrating an example of a storage management system.

FIG. 1 illustrates an example of a storage management system 100.

As illustrated in FIG. 1, the storage management system 100 includes a host 110, a memory buffer 120, channel controllers 141 through 144, and an input/output bus 130.

Storage block (1) 151 and storage block (2) 152 are connected with the input/output bus 130 via a channel controller (1) 141, and storage block (3) 153 and storage block (4) 154 are connected with the input/output bus 130 via a channel controller (2) 142.

In addition, storage block (5) 155 and storage block (6) 156 are connected with the input/output bus 130 via a channel controller (3) 143, and storage block (7) 157 and storage block (8) 158 are connected with the input/output bus 130 via a channel controller (4) 144.

The input/output bus 130 performs an interface function among the host 110, the memory buffer 120, and the plurality of storage blocks 151, 152, 153, 154, 155, 156, 157, and 158.

The storage management system 100 inputs/outputs data into/from each of the plurality of storage blocks in parallel via the input/output bus 130.

Where the storage management system 100 manages each of the plurality of storage blocks, the storage management system 100 generates a channel group by grouping at least one channel, and manages the plurality of storage blocks for each channel group.

A configuration in which two storage blocks are connected with each channel controller is illustrated in FIG. 1. As a non-limiting illustration, 'N' storage blocks may be connected with each channel controller.

Figure 2:
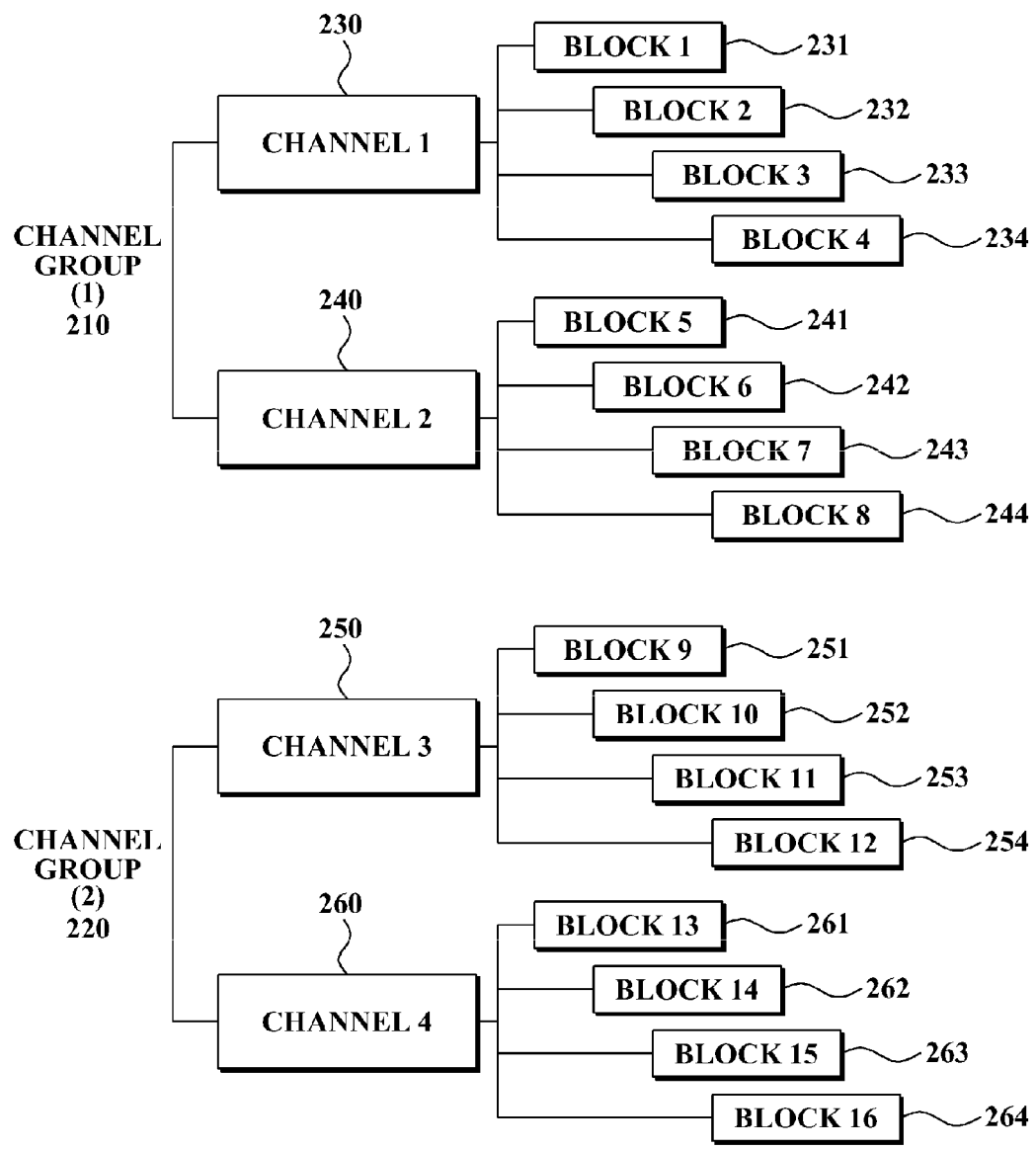
FIG. 2 is a diagram illustrating an example of a portion of a storage management system.

FIG. 2 illustrates a portion of a storage management system according to another general aspect.

As illustrated in FIG. 2, each channel includes four storage blocks.

Storage block (1) 231, storage block (2) 232, storage block (3) 233, and storage block (4) 234 are connected with an input/output bus via a channel controller (1) 230.

Storage block (5) 241, storage block (6) 242, storage block (7) 243, and storage block (8) 244 are connected with the input/output bus via a channel controller (2) 240.

The storage management system may generate channel group (1) 210 by grouping channel controller (1) 230 and channel controller (2) 240. The storage management system may manage a plurality of storage blocks connected with at least one of channel controller (1) 230 and channel controller (2) 240 as a plurality of storage blocks included in channel group (1) 210.

Storage block (9) 251, storage block (10) 252, storage block (11) 253, and storage block (12) 254 are connected with the input/output bus via a channel controller (3) 250.

Storage block (13) 261, storage block (14) 262, storage block (15) 263, and storage block (16) 264 are connected with the input/output bus via a channel controller (4) 260.

The storage management system may generate a channel group (2) 220 by grouping the channel controller (3) 250 and the channel controller (4) 260. The storage management system may manage a plurality of storage blocks connected with at least one of channel controller (3) 250 and channel controller (4) 260 as a plurality of storage blocks included in a channel group (2) 220.

According to a general aspect, the storage management system may generate a super page by grouping pages of the same number in the plurality of storage blocks included in each channel group. The storage management system may input/output, in parallel, data corresponding to the pages included in the super page.

The storage management system may generate a first super page by grouping a first page of storage block (1) 231 connected with channel controller (1) 230 and a first page of storage block (5) 241 connected with channel controller (2) 240.

A configuration in which four storage blocks are connected with each channel controller is illustrated in FIG. 2. As a non-limiting illustration 'N' storage blocks may be connected with each channel controller.

Figure 3:
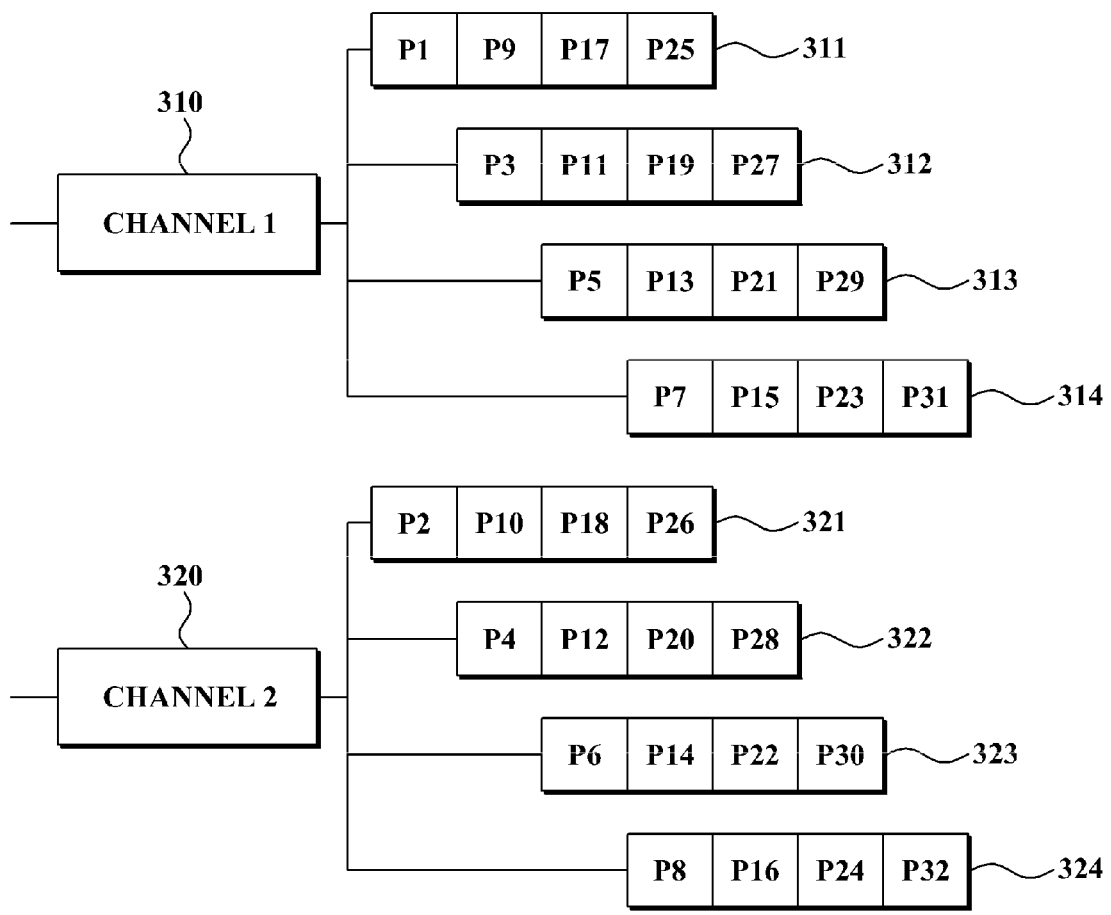
FIG. 3 is a diagram illustrating an example of a channel group of a storage management system.

FIG. 3 illustrates a channel group of a storage management system according to another general aspect.

As illustrated in FIG. 3, a storage management system may generate a channel group by grouping a channel controller (1) 310 and a channel controller (2) 320.

The storage management system manages a plurality of storage blocks by sequentially allocating addresses to pages in the plurality of storage blocks included in the channel group.

Storage block (1) 311, storage block (2) 312, storage block (3) 313, and storage block (4) 314 are connected with an input/output bus via a channel controller (1) 310.

Storage block (5) 321, storage block (6) 322, storage block (7) 323, and storage block (8) 324 are connected with the input/output bus via a channel controller (2) 320.

FIG. 3 illustrates an example of addresses sequentially allocated to pages in a plurality of storage blocks.

A storage management system may sequentially allocate the addresses to the pages according to a sequence of storage block (1) 311, storage block (5) 321, storage block (2) 312, storage block (6) 322, and the like.

Where the pages corresponding to the addresses to which a host is adjacent are concentratedly accessed, an address allocation scheme described with reference to FIG. 3 enables the plurality of storage blocks to be easily managed by inducing the host to access the pages in one page group. The address allocation scheme described with reference to FIG. 3 enables the plurality of storage blocks in one page group to perform garbage collection by inducing the host to access, for example, only the pages in one page group. The storage management system may reduce an overhead where performing the garbage collection by enabling the plurality of storage blocks in one page group to perform the garbage collection.

The storage management system may set a unit for sequentially buffering data in a memory buffer as a section. The storage management system may set a unit for dividing the section by a number of the generated channel groups as an address allocation unit, and allocate an address to each channel group based on the address allocation unit.

For example, where a size of the section is 128 KB (kilobytes), and a number of channel groups is two, 128 KB/2=64 KB is the address allocation unit. Blocks of 0 KB to 63 KB may be allocated to channel group 1, blocks of 64 KB to 127 KB may be allocated to channel group 2, and blocks of 128 KB to 191 KB may be allocated to channel group 1 again.

Figure 4:
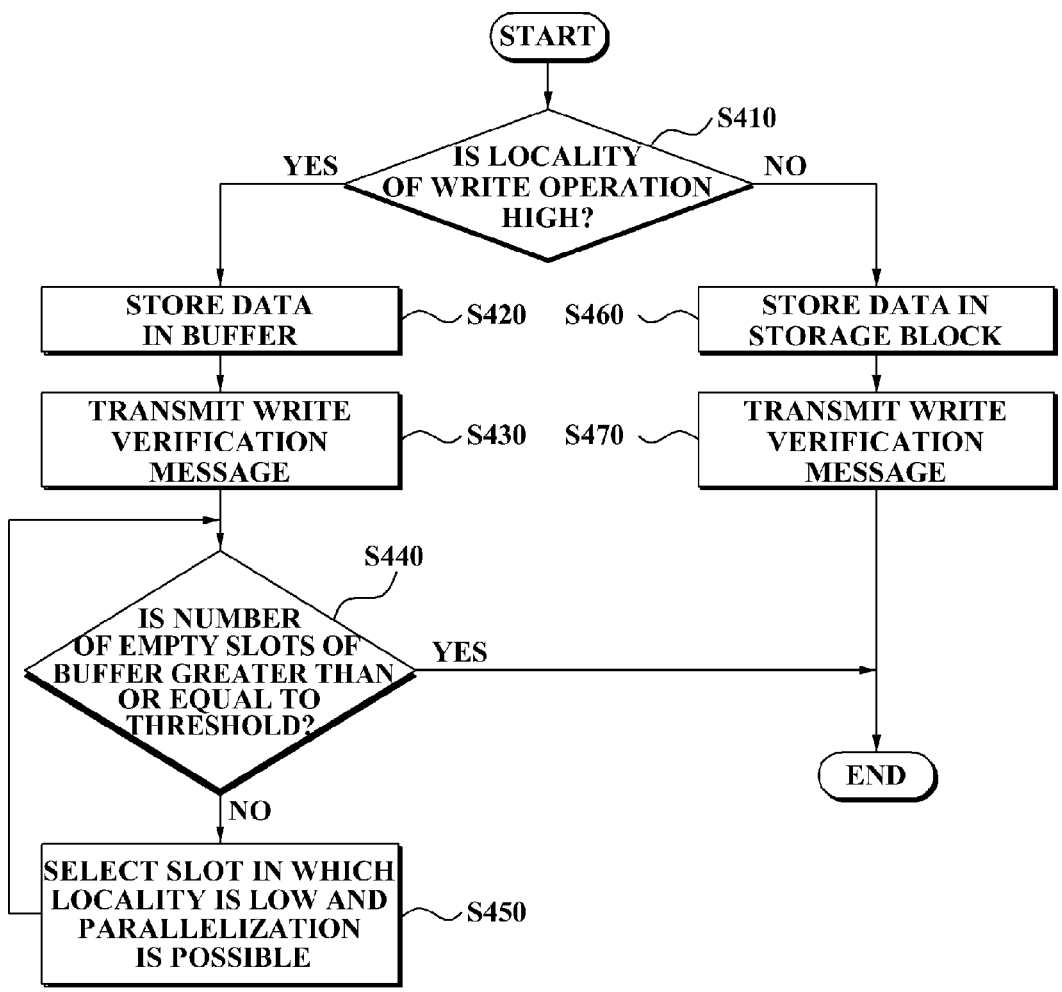
FIG. 4 is a flowchart illustrating an example of a storage management method.

FIG. 4 illustrates a storage management method according to a general aspect.

The storage management method may be performed in a storage device which includes a host, a memory buffer, and a plurality of storage blocks, and in which each of the plurality of storage blocks is connected with an input/output bus via a corresponding channel.

As illustrated in FIG. 4, in operation S410, the storage management method determines whether a locality of a write operation is higher than a predetermined threshold value.

In operation S420, where the locality of the write operation is higher than the predetermined threshold value, the storage management method stores data of the write operation in the memory buffer.

In operation S430, the storage management method transmits a write verification message to the host after storing the data of the write operation in the buffer.

In operation S440, the storage management method determines whether a number of empty slots of the memory buffer is less than a predetermined threshold value.

In operation S450, where the number of empty slots of the memory buffer is less than the predetermined threshold value, the storage management method selects, from among the data stored in the memory buffer, data in which a locality is low and a parallelization is possible. Otherwise, where the number of empty slots of the memory buffer is equal to or greater than the predetermined threshold value in operation S440, processing ends.

According to general aspects, the storage management method may evict data of the selected slot to the plurality of storage blocks.

The storage management method performs operation S440 again after performing operation S450.

In operation S460, where the locality of the write operation is lower than or equal to the predetermined threshold value, the storage management method stores the data of the write operation in a storage block.

In operation S470, the storage management method transmits a write verification message to the host after storing the data of the write operation in the storage block.

Figure 5:
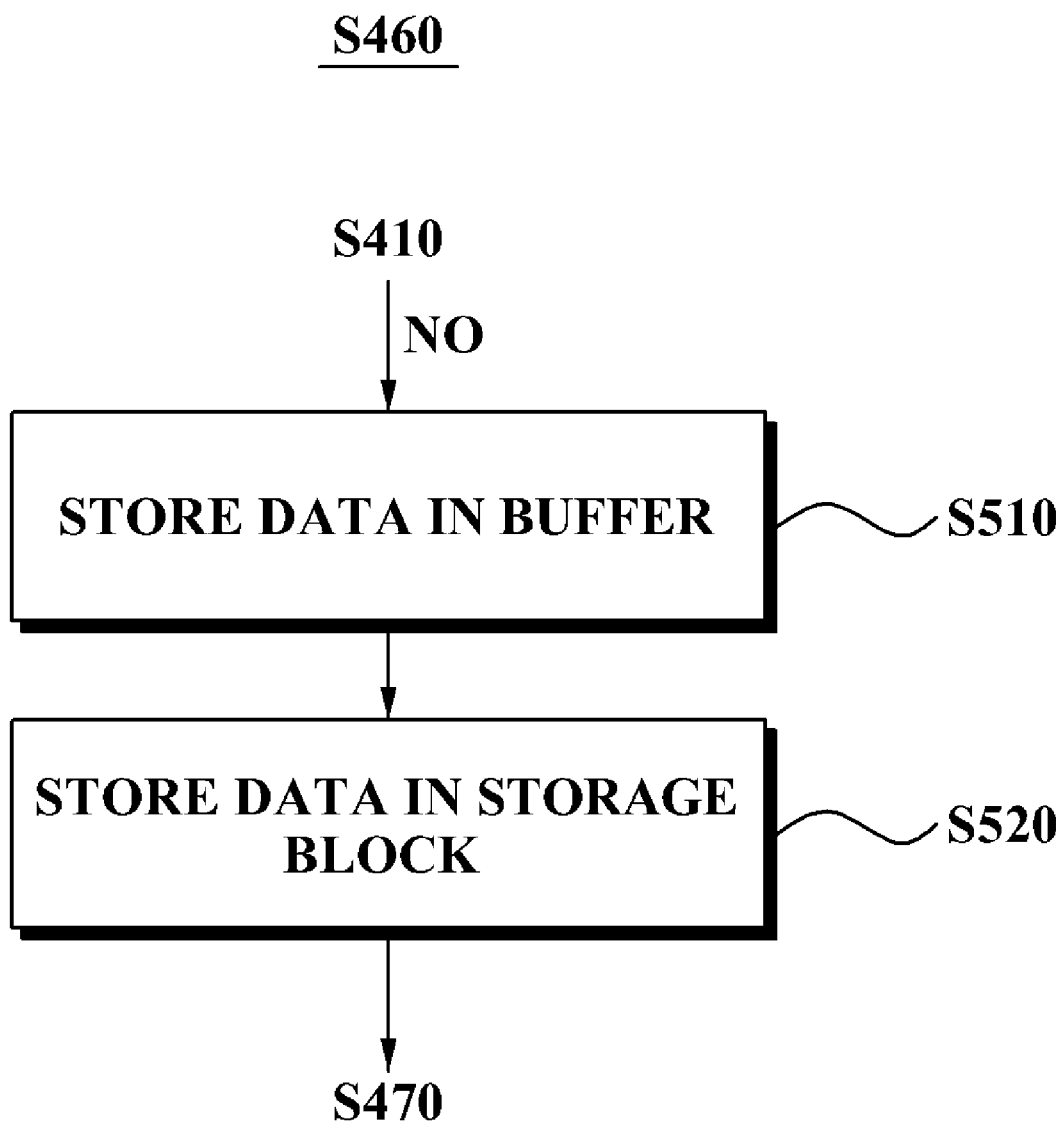
FIG. 5 is a flowchart illustrating an example of operation S460 of FIG. 4.

FIG. 5 illustrates an example of operation S460 of FIG. 4.

As illustrated in FIG. 5, in operation S510, a storage management method stores data of a write operation in a memory buffer.

In operation S520, the storage management method stores the data of the write operation in a storage block after storing the data of the write operation in the memory buffer.

Figure 6:
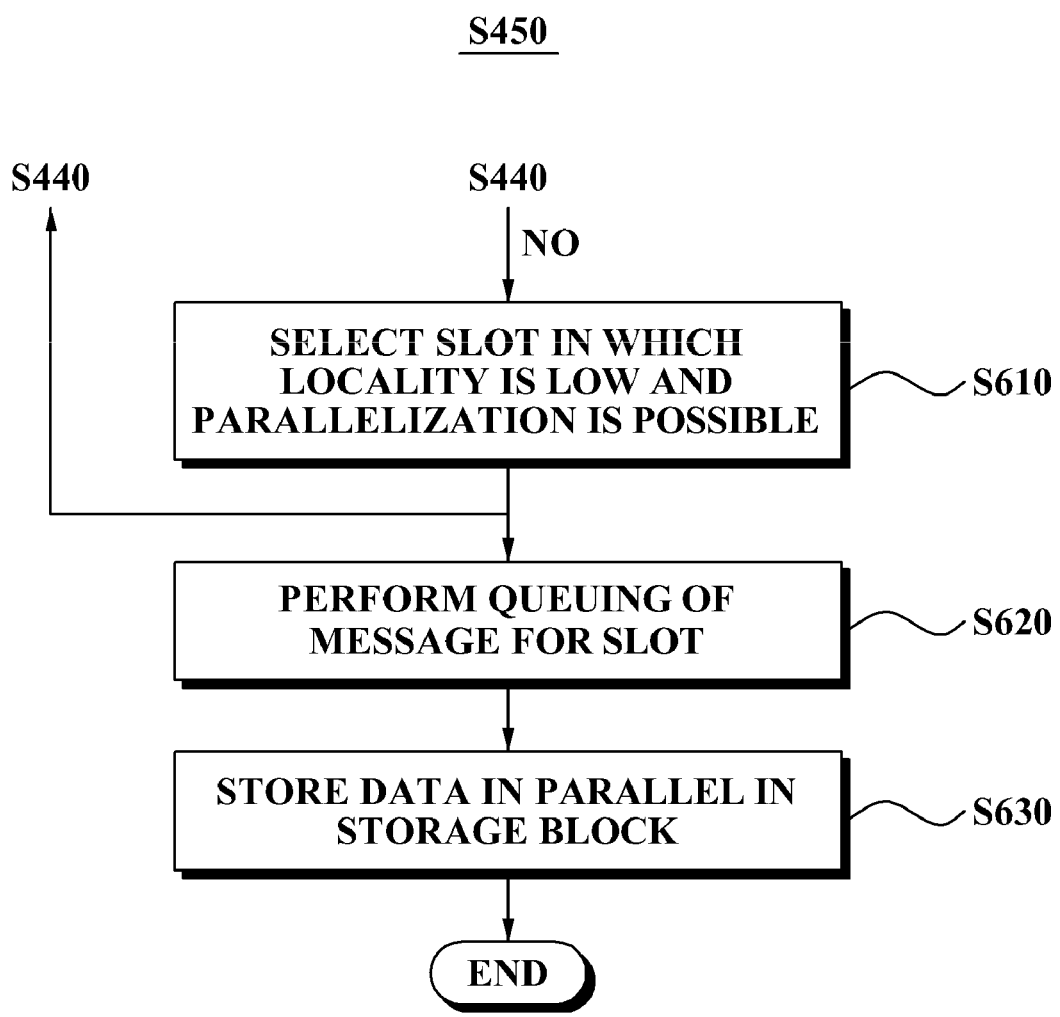
FIG. 6 is a flowchart illustrating an example of operation S450 of FIG. 4.

FIG. 6 illustrates an example of operation S450 of FIG. 4.

As illustrated in FIG. 6, in operation S610, a storage management method selects a slot in which a locality is low and a parallelization is possible.

In operation S620, the storage management method performs queuing of a message for the selected slot.

In operation S630, the storage management method stores data of the selected slot in parallel in a storage block.

Figure 7:
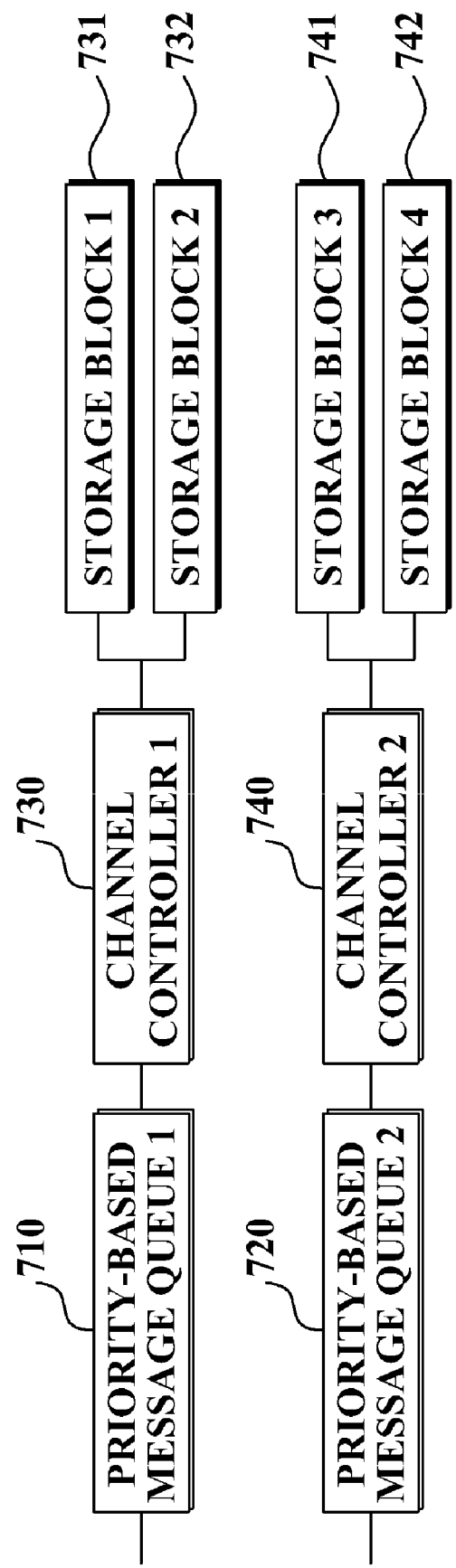
FIG. 7 is a diagram illustrating a portion of a storage management system according to still another general aspect.

FIG. 7 illustrates a portion of a storage management system according to still another general aspect.

As illustrated in FIG. 7, a channel controller (1) 730 is connected with an input/output bus via priority-based message queue memory (1) 710.

A channel controller (2) 740 is connected with the input/output bus via priority-based message queue memory (2) 720.

Storage block (1) 731 and storage block (2) 732 are connected with the input/output bus via a channel controller (1) 730.

In addition, storage block (3) 741 and storage block (4) 742 are connected with the input/output bus via a channel controller (2) 740.

Each of priority-based message queue memory (1) 710 and priority-based message queue memory (2) 720 controls an operation of each of channel controller (1) 730 and channel controller (2) 740 based on a priority standard.

According to a general aspect, the priority standard may be a standard of processing a read operation as a top priority.

The priority standard may be a standard of processing a sequential write operation as a next priority to the read operation.

The priority standard may be a standard of processing a random write operation as a next priority to the sequential write operation.

Where performing the random write operation, the storage management system may evict a portion of data of a memory buffer to a storage block.

Where the input/output bus is idle, the storage management system may perform garbage collection as a background process.

A configuration in which two storage blocks are connected with each channel controller is illustrated in FIG. 7, however, as a non-limiting illustration, 'N' storage blocks may be connected with each channel controller.

A storage management system (not illustrated) according to yet another general aspect selects data to be evicted based on a number of blocks which are already erased for each channel controller and are available.

The storage management system selects a channel group in which an available block greater than or equal to a predetermined reference value exists.

The storage management system evicts, from a memory buffer, data to be stored in a storage block included in the selected channel group.

Where there is at least one channel group in which the available block greater than or equal to the reference value exists, the storage management system selects the channel group based on a locality of the data to be evicted.

Where there is no channel group in which the available block greater than or equal to the reference value exists, the storage management system may select a channel group in which a number of available channel groups is greatest.

Where the input/output bus is idle, the storage management system may perform the garbage collection as a background process.

The storage management system may determine a storage block corresponding to an address of the data stored in the memory buffer based on the address, and determine the channel group including the determined storage block.

The storage management system may calculate a number of available storage blocks necessary for each channel group based on determined information.

The storage management system may compare the calculated number of necessary available storage blocks and a number of current storage blocks and select a channel. In this instance, the storage management system may select a channel in which subtracting the number of current storage blocks from the calculated number of necessary available storage blocks yields a maximum number of storage blocks.

The storage management system may perform the garbage collection for the selected channel as a background process.

The storage management system may secure a space sufficient for performing the garbage collection in the memory buffer.

The storage management system may acquire a sufficient space by evicting the portion of the data stored in the memory buffer to the storage block.

Figure 8:
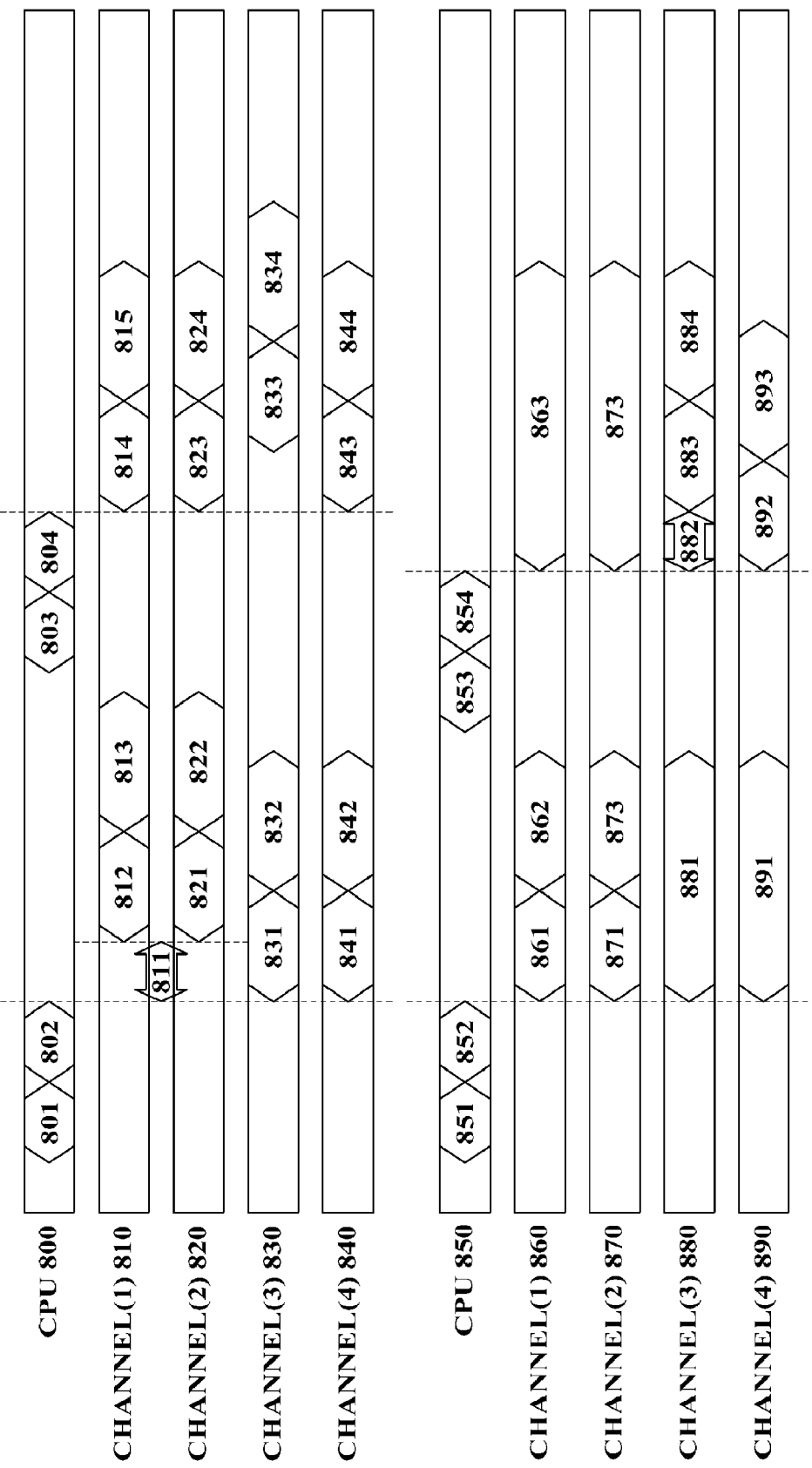
FIG. 8 is a timing diagram illustrating an example of an operation of a storage management system.

FIG. 8 illustrates an operation of a storage management system according to a general aspect.

Referring to FIG. 8, operations of four channels and a processor over time are illustrated.

An operation of the processor 800 and operations of channel (1) 810 to channel (4) 840 illustrate a storage management system in which channel (1) to channel (4) are set as one group.

In a general aspect, a plurality of storage blocks is managed by a coarse-grained channel managing scheme, and where a random access to small-sized data is frequent, a copyback operation for the plurality of storage blocks increases. The copyback operation is a read-modify-write operation of modifying the read data and storing the data again, and is a cause of increasing an access of the plurality of storage blocks.

A time slot 801 denotes a time of performing parsing of an Advanced Technology Attachment (ATA) command and caching of data. The operation is performed in a Host Interface Layer (HIL). During the time slot 801, the storage management system may analyze a request of a host, and determine whether to store the data in at least one of a memory buffer and a flash memory.

Where the storage management system determines that the data is stored in a storage block of the flash memory during the time slot 801, the storage management system converts a logic address into a physical address during a time slot 802. This conversion operation may be performed in a Flash Translation Layer (FTL).

The data transmitted from an outside to the plurality of storage blocks is transmitted via channel (1) and channel (2). The data already stored is copied back in the plurality of storage blocks included in channel (3) and channel (4).

During a time slot 831, data corresponding to a super page from among the data already stored in channel (3) is loaded in a page buffer. During a time slot 841, data corresponding to the super page from among the data already stored in channel (4) is loaded in the page buffer.

During a time slot 832, the data loaded in the page buffer is programmed in a storage block of channel (3). During a time slot 842, the data loaded in the page buffer is programmed in a storage block of channel (4).

During a time slot 811, a time delay that the data is transmitted via an input/output bus is shown.

During a time slot 812, the data needing to be stored in channel (1) is directly loaded in the page buffer by a Direct Memory Access (DMA) controller. During a time slot 821, the data needing to be stored in channel (2) is loaded in the page buffer by the DMA controller.

During a time slot 813, the data loaded in the page buffer is programmed in a storage block of channel (1). During a time slot 822, the data loaded in the page buffer is programmed in a storage block of channel (2).

Where one page is 4 KB and a size of the super page corresponding to the channel group is 16 KB, the above-described process may be performed when 8 KB-data is stored in the storage block via the input/output bus.

During a time slot 803, a preparation process for storing data of a next page is performed in the HIL.

During a time slot 804, the logic address for storing the data is converted into the physical address in the FTL.

Hereinafter, a case where 4 KB-data is stored in the storage block via the input/output bus is described.

During a time slot 814, the data corresponding to the super page from among the data already stored in channel (1) is loaded in the page buffer. During a time slot 823, the data corresponding to the super page from among the data already stored in channel (2) is loaded in the page buffer. During a time slot 843, the data corresponding to the super page from among the data already stored in channel (4) is loaded in the page buffer.

During a time slot 833, external data passing through a time delay is loaded in the page buffer by the DMA controller.

During a time slot 815, the data loaded in the page buffer is copied back in a storage block of page 1. During a time slot 824, the data loaded in the page buffer is copied back in a storage block of page 2. During a time slot 844, the data loaded in the page buffer is copied back in a storage block of page 4.

During a time slot 834, the data loaded in the page buffer is programmed in a storage block of page 3.

While the data copied back and the external data are loaded in the page buffer in the above description, it is understood that the data copied back and the external data may be programmed after being stored in the memory buffer.

An operation of the processor 850 and operations of channel (1) 860 to channel (4) 890 illustrate an example of a storage management system in which channel (1) and channel (2) are set as channel group 1, and channel (3) and channel (4) are set as channel group 2.

A plurality of storage blocks may be managed by a fine-grained channel managing scheme, and where a random access to small-sized data is frequent, a copy back operation for the plurality of storage blocks may be reduced. Also, since an idle channel is generated by the fine-grained channel managing scheme, a parallelism of a storage management may be acquired using the idle channel. The storage management system may acquire an empty space to store the data by performing garbage collection for the idle channel.

During a time slot 851, a preparation process for storing data of a next page is performed in the HIL.

During a time slot 852, the logic address for storing the data is converted into the physical address in the FTL.

Hereinafter, a case where 8 KB-data is stored in the storage block via the input/output bus is described. It is assumed that the converted physical address corresponds to only channel group 1.

During a time slot 861, external data to be stored in channel (1) is loaded in the page buffer by the DMA controller. During a time slot 871, external data to be stored in channel (2) is loaded in the page buffer by the DMA controller.

During a time slot 862, the data loaded in the page buffer is programmed in a storage block of channel (1). During a time slot 872, the data loaded in the page buffer is programmed in a storage block of channel (2).

During a time slot 881, channel (3) is the idle channel. During a time slot 891, channel (4) is the idle channel. The storage management system may perform the garbage collection of channel (3) and channel (4) during the time slot 881 and the time slot 891.

During a time slot 853, a preparation process for storing data of a next page is performed in the HIL.

During a time slot 854, the logic address for storing the data is converted into the physical address in the FTL.

Hereinafter, a case where 4 KB-data is stored in the storage block via the input/output bus is described. It is assumed that the converted physical address corresponds to only channel group 3.

During a time slot 892, the data corresponding to the super page from among the data already stored in channel (4) is loaded in the page buffer. During a time slot 882, a time delay experienced by the external data is shown. During a time slot 883, the external data to be stored in channel (3) is loaded in the page buffer by the DMA controller.

During a time slot 893, the data loaded in the page buffer is copied back in a storage block of channel (4). During a time slot 884, the data loaded in the page buffer is programmed in a storage block of channel (3).

During a time slot 863, channel (1) is the idle channel. During a time slot 873, channel (2) is the idle channel. The storage management system may perform the garbage collection for channel (1) and channel (2) during the time slot 863 and the time slot 873.

Figure 9:
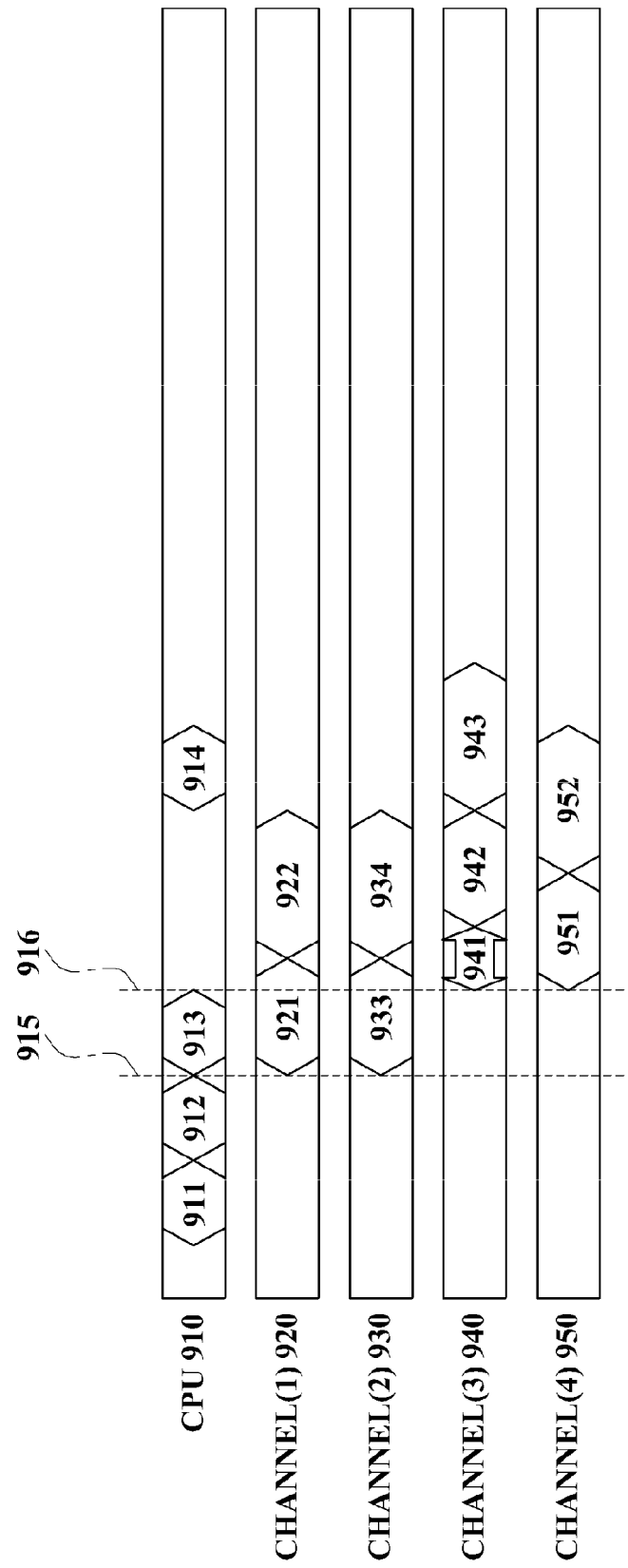
FIG. 9 is a timing diagram illustrating an example of a memory buffer eviction process of a storage management system.

FIG. 9 illustrates a memory buffer eviction process of a storage management system according to another general aspect.

Referring to FIG. 9, operations of four channels and a processor over time are illustrated.

An operation of the processor 910 and operations of channel (1) 920 to channel (4) 950 illustrate an example of a storage management system in which channel (1) and channel (2) are set as channel group 1, and channel (3) and channel (4) are set as channel group 2.

Data stored in a memory buffer may be evicted to a storage block in order to prepare for garbage collection or prepare for a sequential access of large-sized data.

During a time slot 911, a preparation process for storing data of a next page is performed in an HIL. In this instance, the HIL may support data storage of channel group 1 and channel group 2 in parallel.

During a time slot 912, a logic address for storing the data is converted into a physical address in an FTL. In this instance, the data to be stored in the storage block is data to be stored in channel group 1, that is, channel (1) and channel (2).

During a time slot 921 and a time slot 933, the data corresponding to the physical address converted during the time slot 912 is loaded in a page buffer by a DMA controller.

During a time slot 922, the data loaded in the page buffer is programmed in a storage block of channel (1) indicated by the physical address. Also, during a time slot 934, the data loaded in the page buffer is programmed in a storage block of channel (2) indicated by the physical address.

During a time slot 913, the logic address corresponding to the data to be stored in channel group 2, that is, channel (3) and channel (4) are converted into the physical address in the FTL.

During a time slot 951, data to be copied back from among the data to be stored in channel (4) is loaded in the page buffer. During a time slot 952, the data loaded in the page buffer is copied back in a storage block of channel (4) corresponding to the converted physical address.

During a time slot 941, a time delay experienced by data to be stored in channel (3) while passing through an input/output bus is shown. During a time slot 942, the data to be stored in channel (3) is loaded in the page buffer. During a time slot 943, the data loaded in the page buffer is programmed in a storage block of channel (3) corresponding to the converted physical address.

During a time slot 914, a preparation process of an access operation of next data for channel group 1 is performed. Since an access of channel group 1 is completed during the time slot 922 and the time slot 934, the storage management system may prepare for the access operation of the next data.

The methods described above including a storage management method may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of general aspects have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A storage management system, the system comprising:
a host;
a memory buffer; and
an input/output bus; and
a plurality of channel groups, each of the channel groups comprising a plurality of channels, each of the channels comprising:
  a channel controller connected to the input/output bus; and
  a plurality of storage blocks connected to the channel controller in parallel, the input/output bus being configured to perform an interface function among the host, the memory buffer, and each of the storage blocks, the channel controller being configured to enable management of each of the storage blocks, each of the storage blocks being configured to input/output data in parallel via the input/output bus,
wherein:
  where a locality of a write operation is greater than a reference value, the memory buffer is configured to:
    store data of the write operation; and
    transmit a write verification message to the host; and
  where a plurality of empty slots of the memory buffer is less than a threshold, the memory buffer is configured to:

select, from among the data stored in the memory buffer, a slot of the plurality of empty slots in which a locality is low and a parallelization is possible; and evict data of the selected slot to the plurality of storage blocks.

2. The system of claim 1, wherein each of the storage blocks comprises pages of the same number that are grouped in each of the storage blocks to generate a super page, each of the storage blocks being configured to input/output, in parallel, data corresponding to the super page.

3. The system of claim 1, wherein:

each of the storage blocks comprises a plurality of pages; and each of the channel groups is configured to enable sequential allocation of addresses to the plurality of pages to enable the management of each of the storage blocks.

4. The system of claim 1, wherein:

each of the storage blocks comprises a plurality of pages; and an address is allocated to each of the channel groups for each of the pages, the address dividing a section by the plurality of channel groups, the section configured to sequentially buffer data in the memory buffer.

5. The system of claim 1, wherein the memory buffer is further configured to:

calculate a plurality of available erase blocks corresponding to each of the channels;

select one of the plurality of channel groups in which the calculated plurality of available erase blocks is greatest; and evict, to the plurality of storage blocks, data corresponding to the selected one of the plurality of channel groups.

6. The system of claim 1, wherein each of the storage blocks is configured to:

select one of the plurality of channels based on a difference between a plurality of available erase blocks required for each of the channels and a plurality of currently available erase blocks corresponding to each of the channels; and perform garbage collection for the selected one of the plurality of channels.

7. The system of claim 1, further comprising:

a plurality of message queue memories configured to:

connect each of the channels to the input/output bus; and control an operation of each of the channels based on a priority standard of data in which queuing is performed in each of the message queue memories.

8. A storage management method of a storage management system that includes a host, a memory buffer, an input/output bus, and a plurality of channel groups, the method comprising:

generating the plurality of channel groups, comprising:

grouping a plurality of channels for each of the channel groups, each of the channels including a channel controller connected to the input/output bus and a plurality of storage blocks connected to the channel controller in parallel; and performing an interface function among the host, the memory buffer, and each of the storage blocks using the input/output bus;

managing each of the storage blocks for the channel controller;

inputting/outputting, by each of the storage blocks, data in parallel via the input/output bus;

storing data of a write operation in the memory buffer where a locality of the write operation is greater than a reference value;

transmitting a write verification message to the host in response to the storing of the data of the write operation;

selecting, from among the data stored in the memory buffer, one of a plurality of slots in which a locality is low and having a parallelism where the plurality of empty slots of the memory buffer is less than a threshold; and evicting data of the selected one of the plurality of slots to the plurality of storage blocks.

9. The method of claim 8, further comprising:

generating a super page by grouping pages of the same number in each of the storage blocks; and simultaneously inputting/outputting, in parallel, data corresponding to the generated super page using each of the storage blocks.

10. The method of claim 8, further comprising, where each of the storage blocks includes a plurality of pages, sequentially allocating addresses to the plurality of pages in each of the storage blocks.

11. The method of claim 8, further comprising:

calculating a plurality of available erase blocks corresponding to each of the channels;

selecting one of the plurality of channel groups in which the calculated plurality of available erase blocks is greatest; and evicting, to the plurality of storage blocks, data corresponding to the selected one of the plurality of channel groups.

12. The method of claim 8, further comprising:

selecting one of the plurality of channels based on a difference between a plurality of available erase blocks required for each of the channels and a plurality of currently available erase blocks corresponding to each of the channels; and performing garbage collection for the selected one of the plurality of channels.

13. The method of claim 8, further comprising:

connecting each of the channels to the input/output bus; and controlling an operation of each of the channels based on a priority standard of data in which queuing is performed.

14. The method of claim 13, wherein each of the channels is connected to the input/output bus via a priority-based message queue memory.

15. A computer-readable recording medium storing a program for implementing a storage management method of a storage management system that includes a host, a memory buffer, an input/output bus, and a plurality of channel groups, the method comprising:

generating the plurality of channel groups, comprising:

grouping a plurality of channels for each of the channel groups, each of the channels including a channel controller connected to the input/output bus and a plurality of storage blocks connected to the channel controller in parallel; and performing an interface function among the host, the memory buffer, and each of the storage blocks using the input/output bus;

managing each of the storage blocks for the channel controller; and inputting/outputting, by each of the storage blocks, data in parallel via the input/output bus;

storing data of a write operation in the memory buffer where a locality of the write operation is greater than a reference value;

transmitting a write verification message to the host in response to the storing of the data of the write operation;

selecting, from among the data stored in the memory buffer, one of a plurality of slots in which a locality is low and having a parallelism where the plurality of empty slots of the memory buffer is less than a threshold; and evicting data of the selected one of the plurality of slots to the plurality of storage blocks.

16. The method of claim 15, further comprising:

connecting each of the channels to the input/output bus; and controlling an operation of each of the channels based on a priority standard of data in which queuing is performed.

17. The method of claim 16, wherein each of the channels is connected to the input/output bus via a priority-based message queue memory.

* * * * *